(No Model.)

W. LEGGOTT.
TRANSOM LIFTER.

No. 282,334. Patented July 31, 1883.

Witnesses:
Harry Drury
David Williams

Inventor:
William Leggott
by his Attorneys
Howson and Son

N. PETERS. Photo-Lithographer, Washington, D. C.

UNITED STATES PATENT OFFICE.

WILLIAM LEGGOTT, OF BRADFORD, COUNTY OF YORK, ENGLAND.

TRANSOM-LIFTER.

SPECIFICATION forming part of Letters Patent No. 282,334, dated July 31, 1883.

Application filed March 20, 1883. (No model.)

*To all whom it may concern:*

Be it known that I, WILLIAM LEGGOTT, a subject of the Queen of Great Britain, and residing at Bradford, in the county of York, England, have invented certain Improvements in the Method of and Apparatus for Regulating Fan-Lights, of which the following is a specification.

My invention relates to that class of transom-lifters or fan-lights in which the transom or fan-light is opened and closed by means of a rack, in combination with a worm operated by a pulley and cord; and the object of my invention is to so construct the device that the worm will not travel too far and get out of gear with the rack, but will be locked when it reaches the end of the rack. This object I attain as hereinafter more fully set forth.

Figure 1:
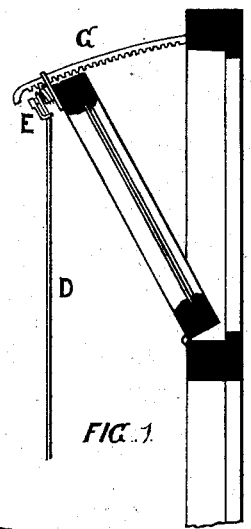
Figure 3:
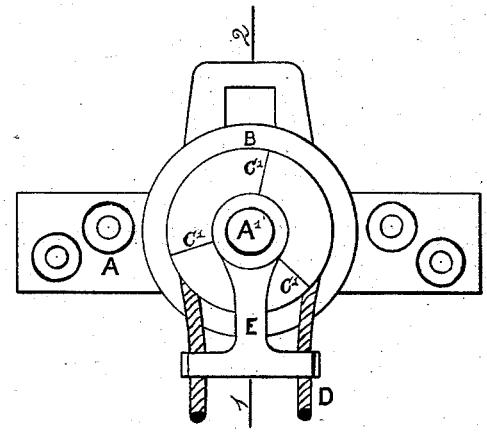
Figure 2:
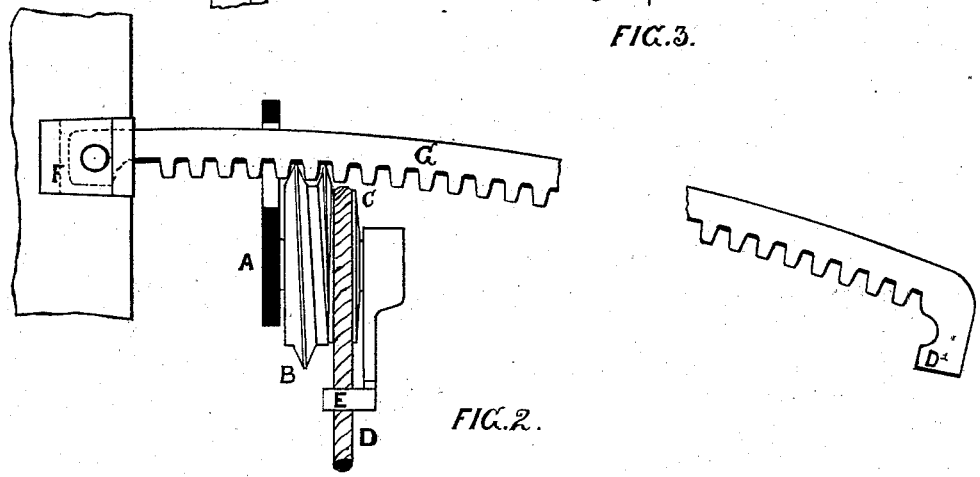
Figure 4:
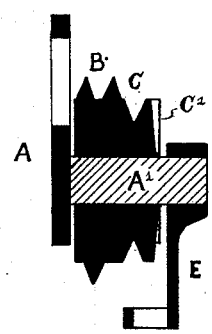

In the accompanying drawings, Figure 1 represents a cross-section through the upper portion of a door or window frame, the fan-light being open and fitted with my improved apparatus. Fig. 2 is an enlarged side elevation of my apparatus, partly in section. Fig. 3 is a front view of the grooved pulley, worm, and bracket; and Fig. 4 is a section through line 1 2 in Fig. 3.

To the top bar of the fan-light I affix the bracket A, to which is secured spindle A', which forms the axle of the worm B and grooved pulley C, around the latter of which is placed the cord or chain D, for actuating the apparatus. This cord is kept in the groove of the pulley by passing through holes formed in the guard E, thereby bringing the ropes nearer together. The guard E is secured to the spindle A', retaining the worm and grooved pulley in the proper position.

Gearing into the worm B is the curved rack G, which is jointed to the bracket F, secured to the top rail of the window or door frame. Thus by actuating the cord or chain D the fan-light is opened or closed, as desired.

In order to prevent the worm traveling too far and locking when it reaches the end of the curved rack, the outside flange of grooved pulley has a number of projections at C', formed thereon somewhat after the manner of an ordinary catch-box used for disengaging shafts in mill-wright work. When the worm is turned to the end of the rack, one of the projections comes in contact with the end of rack at D', thereby preventing the worm being farther turned and locked with the teeth of the rack.

I do not desire to claim, generally, the combination of a fan-light with an adjusting rack and worm; but

I claim as my invention—

The combination of a fan-light, pulley, and worm, having projections C', with a rack, G, having an outer end to come into contact with the said projections, substantially as described.

In testimony whereof I have signed my name to this specification in the presence of two subscribing witnesses.

WILLIAM LEGGOTT.

Witnesses:
 ARTHUR JOSEPH TAYLOR,
 JOHN GILL.